United States Patent
J S

(10) Patent No.: US 11,539,631 B2
(45) Date of Patent: Dec. 27, 2022

(54) NETWORK TRAFFIC MONITORING BASED ON GEOLOCATION INFORMATION

(71) Applicant: Juniper Networks, Inc., Sunnyvale, CA (US)

(72) Inventor: Sheeja J S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 16/915,321

(22) Filed: Jun. 29, 2020

(65) Prior Publication Data

US 2021/0352019 A1    Nov. 11, 2021

(30) Foreign Application Priority Data

May 8, 2020    (IN) .............................. 202041019573

(51) Int. Cl.
*H04L 47/2441*    (2022.01)
*H04L 47/2483*    (2022.01)
*G06F 16/29*    (2019.01)
*H04L 45/00*    (2022.01)
(Continued)

(52) U.S. Cl.
CPC .......... *H04L 47/2441* (2013.01); *G06F 16/29* (2019.01); *H04L 43/08* (2013.01); *H04L 45/38* (2013.01); *H04L 47/2416* (2013.01); *H04L 47/2483* (2013.01)

(58) Field of Classification Search
CPC ..... H04L 47/2441; H04L 43/08; H04L 45/38; H04L 47/2416; H04L 47/2483; H04L 43/04; H04L 43/062; H04L 43/0876; H04L 43/12; G06F 16/29; H04W 40/20
See application file for complete search history.

(56) References Cited

U.S. PATENT DOCUMENTS

| 7,072,337 B1 | 7/2006 | Arutyunov et al. |
| 7,565,407 B1 | 7/2009 | Hayball |
| 7,747,737 B1 | 6/2010 | Apte et al. |

(Continued)

OTHER PUBLICATIONS

Extended European Search Report for Application No. EP20191879.4, dated Feb. 4, 2021, 5 pages.

*Primary Examiner* — Jamal Javaid
*Assistant Examiner* — Shawn D Miller
(74) *Attorney, Agent, or Firm* — Harrity & Harrity, LLP

(57) ABSTRACT

A network monitoring device may receive, from a mediation device, flow-tap geolocation information that identifies a geographical location (e.g., that is derived based on current and/or previous flow-tap investigation reports) and may obtain, from a geographical Internet protocol (GeoIP) database and based on the flow-tap geolocation information, a plurality of Internet protocol (IP) addresses that are associated with the geographical location. The network device may map the plurality of IP addresses to a flow-tap content destination address of a content destination device in a plurality of entries of a flow-tap geolocation filter. The network device may detect, based on the flow-tap geolocation filter, a traffic flow that is associated with the geographical location, may generate a traffic flow copy, and may provide the traffic flow copy to the flow-tap content destination address, wherein the traffic flow copy is to be accessible to the content destination to enable a context analysis of the traffic flow.

20 Claims, 10 Drawing Sheets

(51) Int. Cl.
 *H04L 43/08* (2022.01)
 *H04L 47/2416* (2022.01)

(56) References Cited

U.S. PATENT DOCUMENTS

| | | |
|---|---|---|
| 2003/0133450 A1 | 7/2003 | Baum |
| 2010/0291906 A1 | 11/2010 | DeLuca et al. |
| 2013/0259037 A1 | 10/2013 | Natarajan et al. |
| 2014/0157405 A1 | 6/2014 | Joll et al. |
| 2016/0253689 A1 | 9/2016 | Milton et al. |
| 2017/0155687 A1 | 6/2017 | Cartmell et al. |
| 2018/0330599 A1 | 11/2018 | Burke et al. |
| 2019/0014017 A1* | 1/2019 | Paul .................... H04L 41/0663 |
| 2019/0020689 A1 | 1/2019 | Porras et al. |
| 2019/0116111 A1 | 4/2019 | Izard et al. |
| 2019/0260654 A1 | 8/2019 | Toshniwal et al. |
| 2020/0197794 A1* | 6/2020 | Fraser .................... H04L 45/121 |
| 2020/0211358 A1* | 7/2020 | Burke .................... G08B 13/00 |

\* cited by examiner

US 11,539,631 B2

NETWORK TRAFFIC MONITORING BASED ON GEOLOCATION INFORMATION

CROSS-REFERENCE TO RELATED APPLICATION

This application claims priority to Indian Provisional Application No. 202041019573 entitled "NETWORK TRAFFIC MONITORING BASED ON GEOLOCATION INFORMATION," filed on May 8, 2020. The entire content of which is expressly incorporated herein by reference.

BACKGROUND

Lawful interception includes obtaining network traffic from a network device pursuant to a lawful authority for the purpose of analysis and/or evidence. Such traffic may include signaling or network management information or content of communications.

SUMMARY

According to some implementations, a method may include receiving, by a network device of a network, flow-tap geolocation information that identifies a geographical location that is to be monitored by a content destination device; obtaining, by the network device and based on the flow-tap geolocation information, a plurality of Internet protocol (IP) addresses that are associated with the geographical location, wherein the plurality of IP addresses are obtained from a geographical IP (GeoIP) database that maps active IP addresses to geographical information; mapping, by the network device, the plurality of IP addresses to a flow-tap content destination address of the content destination device in a plurality of entries of a flow-tap geolocation filter, wherein the flow-tap geolocation filter is associated with a data structure of the network device; analyzing, by the network device and using the flow-tap geolocation filter, network traffic of the network to detect a traffic flow that is associated with the geographical location based on the traffic flow being associated with an IP address of the plurality of IP addresses; generating, by the network device and based on detecting the traffic flow in the network traffic, a traffic flow copy that is associated with the traffic flow; and providing, by the network device and based on the flow-tap content destination address, the traffic flow copy to the flow-tap content destination address, wherein the traffic flow copy is to be accessible to the content destination to enable a context analysis of the traffic flow.

According to some implementations, a network device may include one or more memories and one or more processors to: receive, from a mediation device, flow-tap geolocation information, wherein the flow-tap geolocation information identifies a geographical location that is to be monitored by a content destination device; determine, based on the flow-tap geolocation information, an IP address that is associated with the geographical location; generate an entry of a flow-tap geolocation filter that maps the IP address to a flow-tap content destination address of the content destination device, wherein the flow-tap geolocation filter is associated with a data structure of the network device; monitor, using the flow-tap geolocation filter, network traffic of a network to identify a traffic flow that is associated with the geographical location; process, based on identifying the traffic flow in the network traffic, the traffic flow for a transmission of the traffic flow to a traffic flow destination of the traffic flow; generate, based on processing the traffic flow, a traffic flow copy of the traffic flow; provide, based on the entry, the traffic flow copy to the flow-tap content destination address to permit the mediation device to access the traffic flow copy via the content destination device; and transmit the traffic flow to the traffic flow destination.

According to some implementations, a non-transitory computer-readable medium may store one or more instructions. The one or more instructions, when executed by one or more processors of a network device, may cause the one or more processors to: obtain, from a GeoIP database and based on flow-tap geolocation information, an IP address that is associated with a geographical location, wherein the geographical location identified by the flow-tap geolocation information; map, in an entry of a flow-tap geolocation filter, the IP address to a flow-tap content destination address, wherein the flow-tap content destination address was received in association with the flow-tap geolocation information; detect, based on monitoring network traffic of a network, a traffic flow of the network traffic that is associated with the geographical location and a traffic flow destination, wherein the traffic flow is detected based on the IP address being identified in the traffic flow; generate, based on detecting the traffic flow in the network traffic, a traffic flow copy that is associated with the traffic flow; and provide, based on the entry mapping the IP address to the flow-tap content destination address, the traffic flow copy to a content destination device that is associated with the flow-tap content destination address.

DETAILED DESCRIPTION

Figure 1A:
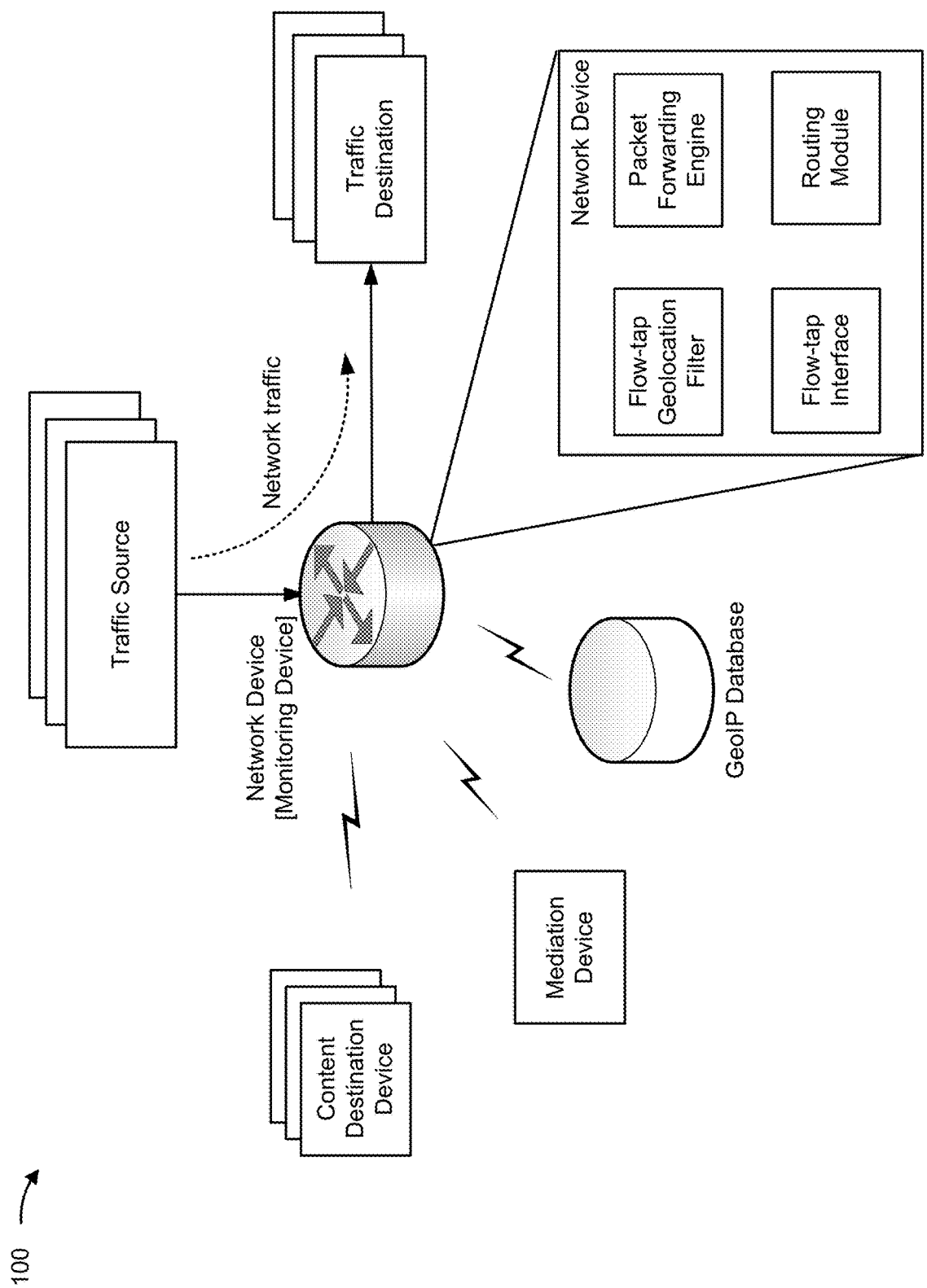
FIGS. 1A-1D are diagrams of an example implementation described herein.

The following detailed description of example implementations refers to the accompanying drawings. The same reference numbers in different drawings may identify the same or similar elements.

Lawful interception (LI) is a process for obtaining network traffic related to an individual (a target), as authorized by a judicial or administrative order, and providing the network traffic to a law enforcement agency (LEA) (e.g., a police department, a government agency, and/or the like). The network traffic may be lawfully intercepted at a network device (e.g., a router, a firewall, and/or the like) via flow tapping. To perform flow tapping, the network device copies or mirrors the network traffic that passes through the network device, forwards the original network traffic to an intended destination, and forwards the copied network traffic to a content destination device (e.g., associated with the LEA) that analyzes the copied network traffic. Network devices are only capable of tapping network traffic (e.g., packets) based on a specific set of defined parameters, such as a source Internet protocol (IP) address, a destination IP address, a source port, a destination port, and/or the like.

This may cause the network device to copy network traffic from a particular traffic source (e.g., associated with a target)

and/or to a particular traffic destination (e.g., associated with the target or another target) associated with fraudulent activity, dangerous activity (e.g., terrorist activity, organized crime activity, and/or the like), and/or the like. However, the target may be utilizing additional traffic sources and/or traffic destinations that are unknown to the LEA and therefore the network device may not know to perform flow tapping of additional network traffic associated with the fraudulent activity, dangerous activity, and/or the like. This may cause some or all of the fraudulent activity, the dangerous activity (e.g., terrorist activity, organized crime activity, and/or the like) to not be detected and/or addressed by the LEA. Furthermore, computing resources (e.g., processing resources, memory resources, and/or the like) may be wasted by using such computing resources to identify, investigate, and/or rectify fraudulent activity, dangerous activity, and/or the like that could otherwise be prevented.

Some implementations described herein provide a network device (e.g., a monitoring device) that is able to identify network traffic associated with a geographical location. In some implementations, a mediation device (e.g., an authorized user device) may send flow-tap geolocation information (e.g., that indicates the geographical location that is to trigger the flow tapping process) to the network device. The network device may obtain one or more IP addresses associated with the geographical location (e.g., by searching a geographic IP (GeoIP) database based on the flow-tap geolocation information) and may generate an entry in a flow-tap geolocation filter associated with the flow-tap geolocation information and the one or more IP addresses. The network device may analyze and/or monitor network traffic using the flow-tap geolocation filter to identify a packet that includes source or destination information that matches source or destination information of an entry in the flow-tap geolocation filter (e.g., to identify a packet that originated from or is destined for the geographical location). The network device may therefore perform a flow tapping process for a traffic flow associated with the packet to send a traffic flow copy to a content destination device (e.g., an authorized tapping device) associated with an LEA (e.g., for the authorized tapping device to analyze the traffic flow copy).

In this way, the network device may identify one or more traffic sources and/or traffic destinations associated with a geographical location that is associated with a target and use flow tapping to intercept network traffic associated with the one or more traffic sources and/or traffic destinations. This may increase a likelihood of obtaining network traffic associated with fraudulent activity, dangerous activity, and/or the like. This may also increase a likelihood of obtaining more details, more information, and/or the like regarding the fraudulent activity, the dangerous activity, and/or the like, than would be obtained by flowing tapping just a subset of the one or more traffic sources and/or traffic destinations. This may increase a likelihood that fraudulent activity, dangerous activity, and/or the like will be detected and/or addressed by the LEA. Furthermore, computing resources (e.g., processing resources, memory resources, and/or the like) may be conserved by preventing fraudulent activity, dangerous activity, and/or the like, where such computing resources would otherwise be needed to identify, investigate, and/or rectify fraudulent activity, dangerous activity, and/or the like.

FIGS. 1A-1D are diagrams of one or more examples 100 associated with network traffic monitoring based on geolocation information. As shown in FIGS. 1A-1D, example(s) 100 includes a mediation device (e.g., an authorized user device), one or more content destination devices (e.g., one or more authorized tapping devices), one or more traffic sources (e.g., one or more origination endpoint devices), one or more traffic destinations (e.g., one or more destination endpoint devices), a network device (also referred to as a monitoring device, a network monitoring device, and/or the like) and/or a geographical IP (GeoIP) database. As shown in FIG. 1A, the one or more traffic sources may transmit network traffic (e.g., Internet protocol (IP) version 4 (IPv4) traffic, IP version 6 (IPv6 traffic), and/or the like) to the one or more traffic destinations via the network device (e.g., a router, a switch, and/or the like).

A mediation device may be a user device, a client device, and/or the like of an LEA or other authorized organization for providing flow-tap geolocation information that identifies one or more geographical locations. A content destination device may be a user device, a client device, and/or the like of the LEA, or the other authorized organization, that is to monitor, analyze, and/or the like, network traffic associated with the one or more geographical locations. As shown in FIG. 1A, the network device may include a flow-tap geolocation filter, a packet forwarding engine, a flow-tap interface, a routing module, and/or the like (e.g., each stored and/or maintained within respective data structures of the network device). The GeoIP database may be stored within the network device and/or may be accessible to the network device.

Figure 1B:
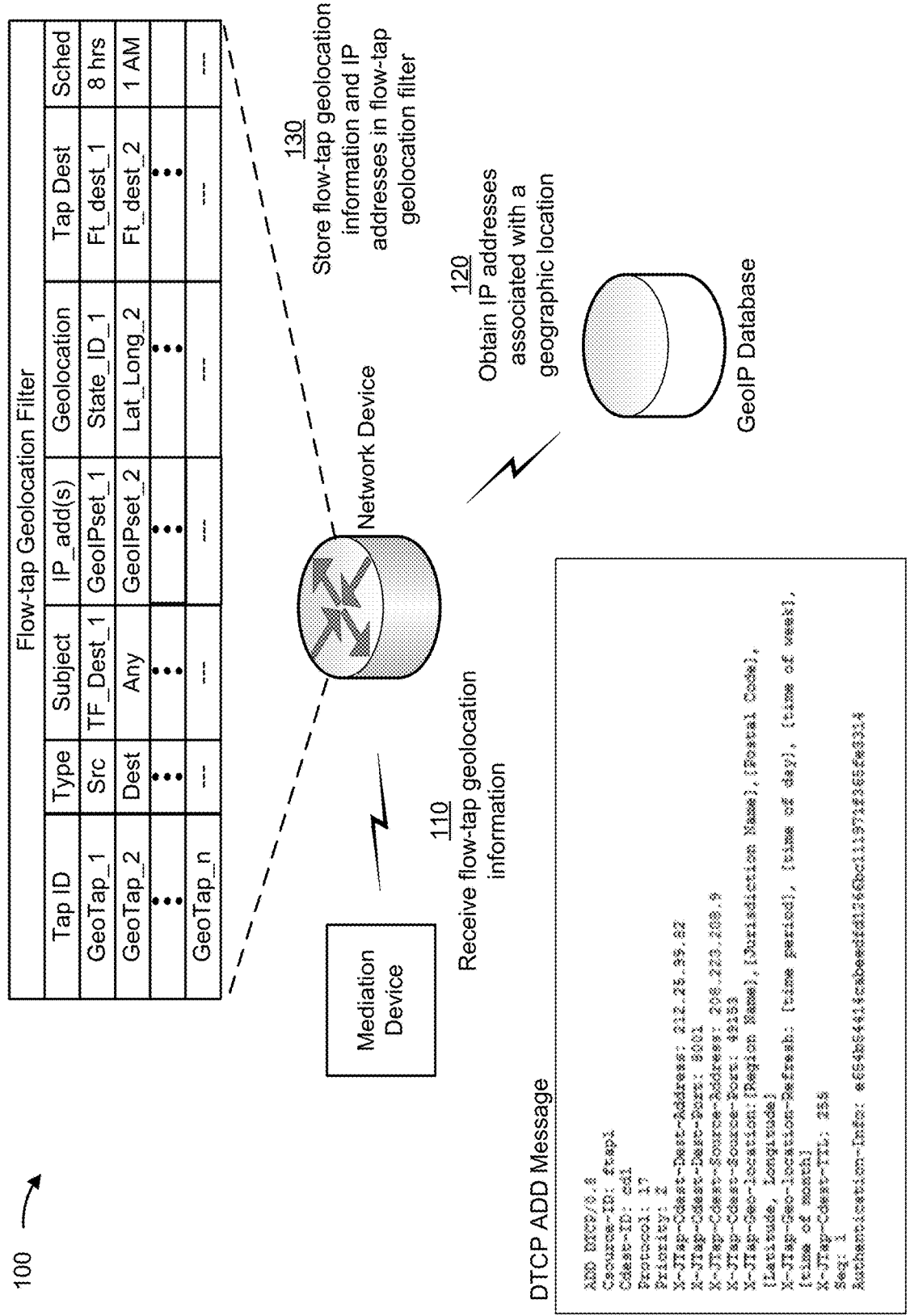

As shown in FIG. 1B and by reference number 110, the network device may receive flow-tap geolocation information from the mediation device. For example, a user (e.g., an LEA representative) may interact with a user interface of the mediation device to cause the mediation device to generate and send the flow-tap geolocation information to the network device. The flow-tap geolocation information may identify a geographical location (e.g., that is associated with network traffic that is to be monitored and/or analyzed by the content destination device), source information (e.g., an address, a port, and/or the like associated with at least one traffic source that may transmit network traffic to the geographical location), destination information (e.g., an address, a port, and/or the like associated with at least one traffic destination that may receive network traffic from the geographical location), flow-tap content destination information (e.g., an address, a port, and/or the like of a content destination device of at least one of the one or more content destination devices), a refresh schedule (e.g., for updating an entry of the flow-tap geolocation filter that is associated with the flow-tap geolocation information, as described herein) and/or the like. In some implementations, the mediation device may generate the flow-tap geolocation information based on current and/or previous investigation reports (e.g., that were generated by the one or more content destination devices) associated with flow tapping. For example, the mediation device may identify, based on the current and/or previous investigation reports, a particular geographical location to monitor and may generate the flow-tap geolocation information to indicate the particular geographical location.

As an example, the flow-tap geolocation information may be included in a dynamic tasking control protocol (DTCP) message (e.g., a DTCP ADD message). As shown in FIG. 1B, a DTCP ADD message may include a destination address field (shown as X-JTap-Cdest-Dest-Address) that indicates an address (shown as 212.25.99.82) of a traffic destination (e.g., that may receive network traffic from the geographical location) that is to be monitored; a destination port field (shown as X-JTap-Cdest-Dest-Port) that indicates a port (shown as 8001) of the traffic destination that is to be monitored; a source address field (shown as X-JTap-Cdest-Source-Address) that indicates an address (shown as 208.223.208.9) of a traffic source (e.g., that may transmit network traffic to the geographical location) that is to be monitored; a source port field (shown as X-JTap-Cdest-Source-Port) that indicates a port (shown as 49153) of the traffic source that is to be monitored; a geographical location field (X-JTap-Geo-location) that indicates a region (e.g., a continent, a world region, and/or the like), a jurisdiction (e.g., a country, a state, a province, a county, a city, a town, a street, a street address, and/or the like), a postal code, geographical coordinates (e.g., a latitude and a longitude), and/or the like (shown as [Region Name], [Jurisdiction Name], [Postal Code], and [Latitude, Longitude]) of a geographical location that is to be monitored; a refresh schedule field (X-JTap-Geo-location-Refresh) that indicates how often or when an entry of the flow-tap geolocation filter associated with the flow-tap geolocation information is to be refreshed and/or updated (shown as [time period], [time of day], [time of week], and [time of month]); and/or a flow-tap content destination field (Cdest-ID) that identifies a content destination tapping device (shown as cd1).

In some implementations, the network device may perform an authentication process to determine whether the mediation device is an authorized device (e.g., whether the mediation device is authorized to provide flow-tap geolocation information, to utilize the flow-tap geolocation filter, and/or the like). For example, the mediation device may send credentials of the mediation device to the network device (e.g., with the flow-tap geolocation information or as a separate data transmission). The network device may verify, based on the credentials, that the mediation device is an authorized device. Additionally, or alternatively, the network device may send the credentials to a server device (e.g., an authentication server device) that processes the credentials to determine whether the credentials are accepted or rejected. Accordingly, the network device may receive, from the server device, an authentication acceptance message (e.g., indicating that the credentials are accepted) or an authentication rejection message (e.g., indicating that the credentials are rejected). The network device may therefore determine, based on receiving an authentication acceptance message, that the mediation device is an authorized device or determine, based on receiving an authentication rejection messages, that the mediation device is not an authorized device.

In some implementations, when the network device determines that the mediation device is not an authorized device, the network device may discard the flow-tap geolocation information. In some implementations, when the network device determines that the mediation device is an authorized device, the network device may store the flow-tap geolocation information and/or analyze network traffic based on the flow-tap geolocation information, as described herein.

As shown by reference number 120, the network device may obtain one or more IP addresses that are associated with the geographical location identified by the flow-tap geolocation information. The network device may obtain the one or more IP addresses from a geographical IP (GeoIP) database that maps active IP addresses to geographical information. The network device may perform a lookup operation that involves scanning and/or searching the GeoIP database for an entry that matches or corresponds to the geographical location and may obtain one or more IP addresses included in the entry (e.g., one or more IP addresses that the entry of the GeoIP database indicates are associated with the geographical location). For example, the network device may search the GeoIP database based on a region, a jurisdiction, a postal code, geographical coordinates, and/or the like associated with a geographical location indicated by the flow-tap geolocation information to identify an entry that matches or corresponds to the geographical location. Accordingly, the network device may obtain the one or more IP addresses included in the entry.

As shown by reference number 130, the network device may store some or all of the flow-tap geolocation information and/or the one or more IP addresses (e.g., obtained from the GeoIP database) in the flow-tap geolocation filter. For example, the network device may generate, based on the flow-tap geolocation information, an entry (e.g., a flow-tap geolocation entry associated with the flow-tap geolocation information and/or the one or more IP addresses) in the flow-tap geolocation filter. As shown in FIG. 1B, the entry may include an entry identifier (shown as Tap ID), a type field (shown as Type), a subject field (shown as Subject), a set of IP addresses field (shown as IP_add(s)), a geolocation field (shown as Geolocation), a flow-tap content destination field (shown in FIG. 1B as Tap Dest), and/or a refresh schedule field (shown as Sched). While some implementations described herein are directed to generating a single entry (e.g., where a single entry is associated with the flow-tap geolocation information and all of the one or more IP addresses), additional implementations directed to generating multiple entries (e.g., where each entry is associated with the flow-tap geolocation information and a single IP address of the one or more IP addresses) are also contemplated.

The network device may cause the type field of the entry to indicate whether the one or more IP addresses are to be monitored as traffic sources (e.g., with the indication Src), as traffic destinations (e.g., with the indication Dest), or as traffic sources and as traffic destinations (e.g., with the indication Any). For example, the network device may cause the type field of the entry to indicate that the one or more IP addresses are to be monitored as traffic sources when the flow-tap geolocation information does not include source information, as traffic destinations when the flow-tap geolocation information does not include destination information, and as traffic sources and as traffic destinations when the geo-location information does not include source information and does not include destination information. In some implementations, the network device may cause the subject field of the entry to include some or all of the source information of the flow-tap geolocation information when the geolocation information includes the source information and does not include destination information. The network device may cause the subject field of the entry to include some or all of the destination information of the flow-tap geolocation information when the geolocation information includes the destination information and does not include source information. The network device may cause, when source information and destination information are not included in the flow-tap geolocation information, the subject field to include an Any designation that indicates that the entry applies to network traffic originating from any traffic source or destined for any traffic source.

In some implementations, the network device may cause the set of IP addresses field to include the one or more IP addresses (e.g., obtained from the GeoIP database and associated with the geographical location of the flow-tap geolocation information). In some implementations, the network device may cause the geolocation field to indicate the geographical location of the flow-tap geolocation information (e.g., the region, the jurisdiction, the postal code, the geographical coordinates, and/or the like of the geographical location).

In some implementations, the network device may cause the flow-tap content destination field of the entry to include some or all of the flow-tap content destination information included in the flow-tap geolocation information. The network device may cause, when the flow-tap content destination information is not included in the flow-tap geolocation information, the flow-tap content destination field to include an address, port, and/or the like of a default content destination device. In some implementations, the network device may cause the refresh schedule field of the entry to indicate the refresh schedule included in the flow-tap geolocation information (e.g., that indicates how often (e.g., every 8 hours) or when (e.g., at 1 AM every day) the entry is to be refreshed and/or updated, as further described herein).

As shown in FIG. 1B, the flow-tap geolocation filter may include one or more entries (shown with Tap_IDs GeoTap_1 to GeoTap n, where n is greater than or equal to 1). For example, a first entry (shown as GeoTap_1) includes a type field that indicates a Src type (e.g., that indicates that the set of IP addresses included in the set of IP addresses field of the entry are to be monitored as traffic sources), a subject field that indicates a TF_Dest_1 traffic destination to be monitored, the set of IP addresses field that indicates a GeoIPset_1 set of IP addresses to be monitored, a geolocation field that indicates a State_ID_1 geographical location associated with the GeoIPset_1 set of IP addresses, a flow-tap content destination field that indicates a Ft_dest_1 content destination device, and a refresh schedule field that indicates the entry is to be updated every 8 hours. As another example, a second entry (shown as GeoTap_2) includes a type field that indicates a Dest type (e.g., that indicates that the set of IP addresses included in the set of IP addresses field of the entry are to be monitored as traffic destinations), a subject field that indicates Any traffic source is to be monitored, the set of IP addresses field that indicates a GeoIPset_2 set of IP addresses to be monitored, a geolocation field that indicates a Lat_Long _2 geographical location associated with the GeoIPset_2 set of IP addresses, a tap-flow content destination field that indicates a Ft_dest_2 content destination device, and a refresh schedule field that indicates the entry is to be updated every day at 1 AM.

In some implementations, a set of IP addresses field of an entry of the flow-tap geolocation filter may include more IP addresses than another entry of the flow-tap geolocation filter. For example, the set of IP addresses field of the first entry may include more IP addresses than the set of IP addresses field of the second entry because the first entry is associated with a larger geographical location (e.g., that is associated with a state associated with State_ID _1 as indicated by the geolocation field of the first entry) than a geographical location associated with the second entry (e.g., that is associated with geographical coordinates associated with Lat_Long _2 as indicated by the geolocation field of the second entry).

In some implementations, the network device may refresh and/or update an entry of the flow-tap geolocation filter. For example, the network device may determine to refresh and/or update the entry according to the refresh schedule indicated by the refresh schedule field of the entry (e.g., every particular amount of time; at a particular time every day, every week, every month, and/or the like; and/or the like). Additionally, or alternatively, the network device may determine to refresh and/or update the entry when the network device determines that the network device has a capacity (e.g., a processing capacity, a memory capacity, and/or the like) to update the entry (e.g., when the network device is processing and/or routing less than a threshold amount of network traffic). The network device may refresh and/or update the entry by obtaining (e.g., from the GeoIP database) one or more new IP addresses that are associated with the geographical location identified by the geolocation field of the flow-tap geolocation filter and updating the set of IP addresses field of the entry to include the one or more new IP addresses. In some implementations, the one or more new addresses may include at least some of the IP addresses that were previously included in the set of IP addresses field.

Figure 1C:
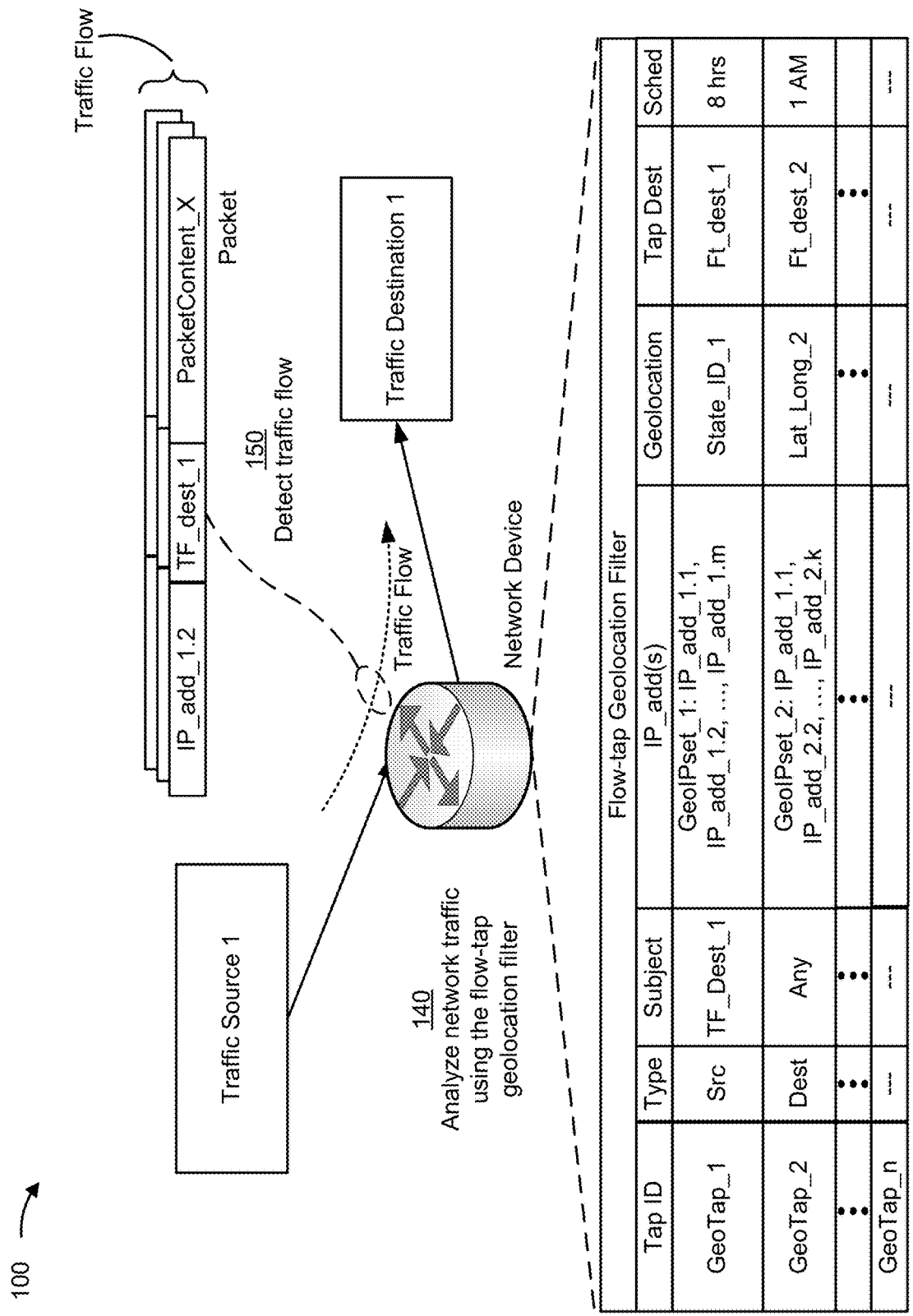

In some implementations, the network device may receive, from the one or more traffic sources, network traffic destined for the one or more traffic destinations. As shown in FIG. 1C and by reference number 140, the network device may monitor and/or analyze the network traffic using the flow-tap geolocation filter. For example, the network device may analyze a packet of the network traffic, which, as shown in FIG. 1C, may include information indicating a source address IP_add_1.2 (e.g., in a source field of the packet), a destination address TF_dest_1 (e.g., in a destination field of the packet), and/or packet content PacketContent_X (e.g., in a payload field of the packet).

In some implementations, the network device may determine (e.g., using deep packet inspection (DPI)) whether the packet matches an entry in the flow-tap geolocation filter. The network device may perform a lookup operation that involves scanning the flow-tap geolocation filter for an entry that matches the packet. For example, the network device may compare (e.g., using DPI) one or more fields of the packet and one or more respective fields of the one or more entries of the flow-tap geolocation filter. The network device may identify an entry that indicates a same source address as the packet, a same destination address as the packet, and/or the like. For example, as shown in FIG. 1C, a first entry (shown as GeoTap_1) of a flow-tap geolocation filter includes: a type field that indicates a Src type that indicates that the IP addresses of GeoIPset_1 (e.g., that includes IP addresses IP_add_1.1 through IP_add_1.m, where m is greater than or equal to 1) included in a set of IP addresses field of the first entry are to be monitored as traffic sources; the set of IP address field that includes an IP address IP_add_1.2 that is the same as the IP address IP_add_1.2 indicated by the source field of the packet; and a subject field that indicates a TF_Dest_1 traffic destination that is the same as the TF_dest_1 traffic destination indicated by the destination field of the packet.

In some implementations, the network device may identify, based on the source address field and the destination address field of the packet, a particular traffic source (shown in FIG. 1C as traffic source 1) and a particular traffic destination (shown in FIG. 1C as traffic destination 1) associated with the packet. As shown by reference number 150, the network device may detect (e.g., based on determining that the packet matches an entry in the flow-tap geolocation filter) a traffic flow that includes the packet and/or one or more additional packets of the network traffic that are transmitted from the particular traffic source to the particular second traffic source. For example, the traffic flow may include a particular number of packets transmitted from the particular traffic sources to the particular traffic destination after the network device determines that the packet matches an entry in the flow-tap geolocation filter (e.g., the next 100 additional packets; the next 1,000 additional packets; the next 10,000 additional packets; and/or the like after the packet). As another example, the traffic flow may include any number of packets transmitted, from the particular traffic source to the particular traffic destination, during a time period after the network device determines that the packet matches an entry in the flow-tap geolocation filter (e.g., for 1 second, 10 seconds, 20 seconds, and/or the like after the network device determines that the packet matches an entry in the flow-tap geolocation filter).

In some implementations, the network device may notify, based on determining that the packet matches an entry in the flow-tap geolocation filter and/or detecting the traffic flow, the content destination device that the packet and/or the traffic flow was identified. For example, the transmitting network device may send, to the flow-tap content destination address (e.g., of the content destination device and/or one or more other content destination devices) indicated by the entry in the flow-tap geolocation filter, a message indicating that a packet and/or traffic flow matches the entry. In some implementations, the network device may receive, from the content destination device (or another content destination device), a response indicating that the network device is to perform a flow tapping process on the traffic flow (e.g., provide a traffic flow copy to the content destination device). The network device therefore may process the traffic flow as described herein in relation to FIG. 1D. Additionally, or alternatively, the network device may receive, from the content destination device (or another content destination device), a response indicating that the network device is to not perform a flow tapping process on the traffic flow. The network device may therefore route the traffic flow using a typical routing process.

Figure 1D:
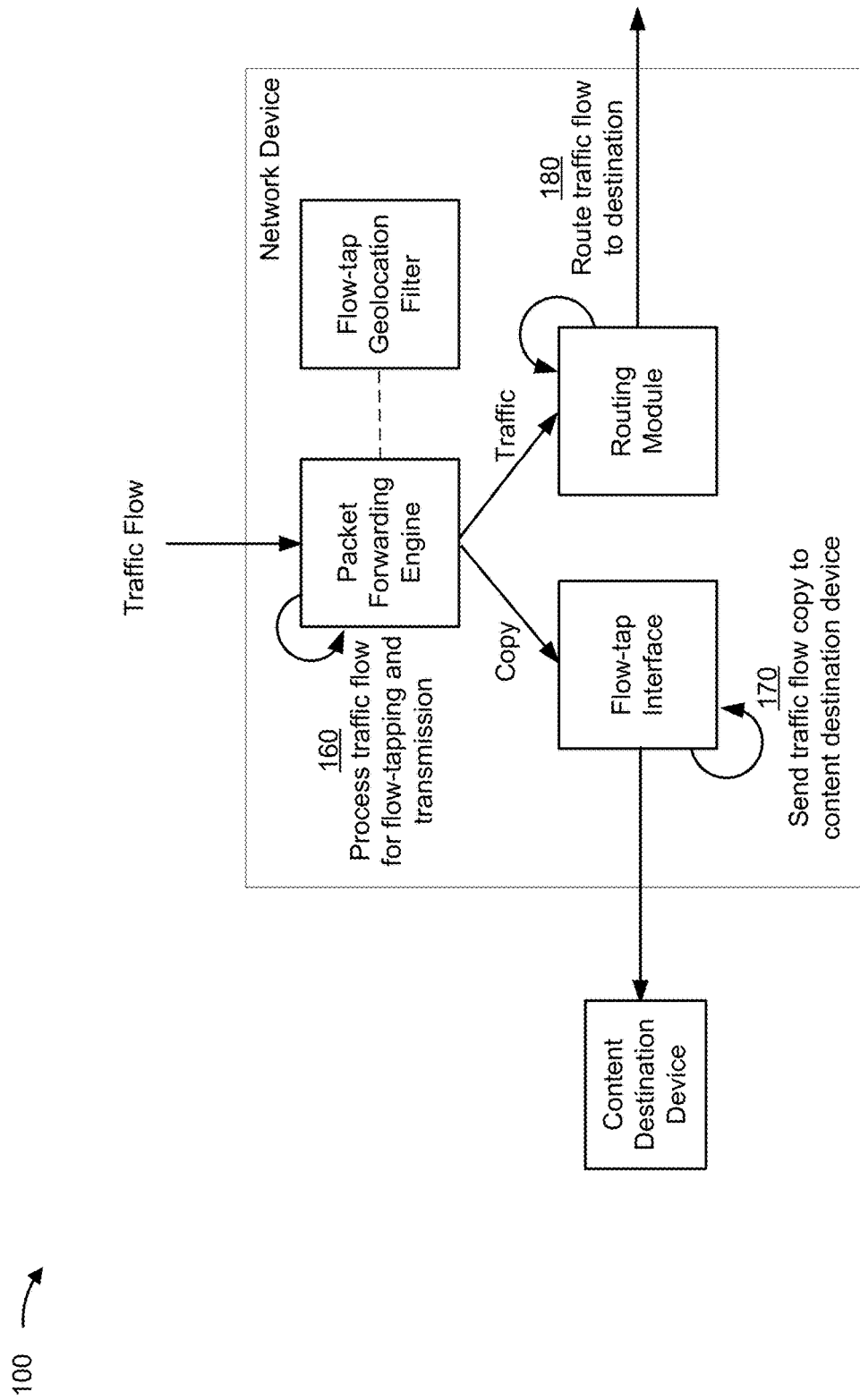

As shown in FIG. 1D and by reference number 160, the network device (e.g., using the packet forwarding engine of the network device) may process the traffic flow. In some implementations, the network device may process the traffic flow to generate a traffic flow copy that corresponds to the traffic flow. For example, the network device may duplicate each packet of the traffic flow to generate the traffic flow copy based, for example, on receiving a response indicating that the network device is to perform a flow tapping process on the traffic flow. The network device, based on the entry of the flow-tap geolocation filter associated with the traffic flow, may include the flow-tap content destination address (e.g., of the content destination device and/or one or more other content destination devices), indicated by the entry, in the traffic flow copy (e.g., the network device may encapsulate each packet of the traffic flow copy with the flow-tap content destination address). As another example, the network device may extract payload data of the traffic flow (e.g., from the respective payload fields of the packets that comprise the traffic flow) and generate new packets that include the extracted payload data to generate the traffic flow copy. Each new packet of the traffic flow copy may include the flow-tap content destination address (e.g., of the content destination device and/or one or more other content destination devices) indicated by the entry.

Additionally, or alternatively, the network device may process the traffic flow to transmit the traffic flow to the traffic destination associated with the traffic flow (e.g., as if the network device did not perform a flow tapping process). For example, the network device may generate routing data indicating that the network device received the traffic flow and/or is to route the traffic flow to the traffic destination associated with the traffic flow. The network device may include the routing data in each packet of the traffic flow (e.g., the network device may encapsulate each packet of the traffic flow with the routing data).

As shown by reference number 170, the network device (e.g., using the flow-tap interface of the network device) may send the traffic flow copy to the content destination device. For example, the network device may send the traffic flow copy to the flow-tap content destination address (e.g., of the content destination device and/or one or more other content destination devices) included in the packets of the traffic flow copy. Additionally, or alternatively, the network device may identify a communication protocol (e.g., an IP protocol, a DTCP protocol, and/or the like) of the content destination device (e.g., for receiving a traffic flow copy) and may configure the traffic flow copy based on the communication protocol. The network device may therefore send the traffic flow copy to the content destination device according to the communication protocol of the content destination device. In some implementations, the network device may send the traffic flow copy to the content destination device via a secure tunnel, such as an IP security (IPsec) tunnel.

In some implementations, the content destination device may process the traffic flow copy to determine a context analysis (e.g., determine whether the traffic flow copy is associated with fraudulent activity, dangerous activity, and/or the like). The content destination device may extract payload data of the traffic flow copy (e.g., from respective payload fields of the packets that comprise the traffic flow copy) and analyze the payload data (e.g., using natural language processing) to determine whether the traffic flow is associated with fraudulent activity, dangerous activity, and/or the like.

As shown by reference number 180, the network device (e.g., using the routing module of the network device) may route the traffic flow to the traffic destination associated with the traffic flow. The network device may route the traffic flow to the traffic destination without any indication to the traffic destination that a flow-tapping process occurred (e.g., without notifying the traffic flow destination that the traffic flow copy was generated).

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
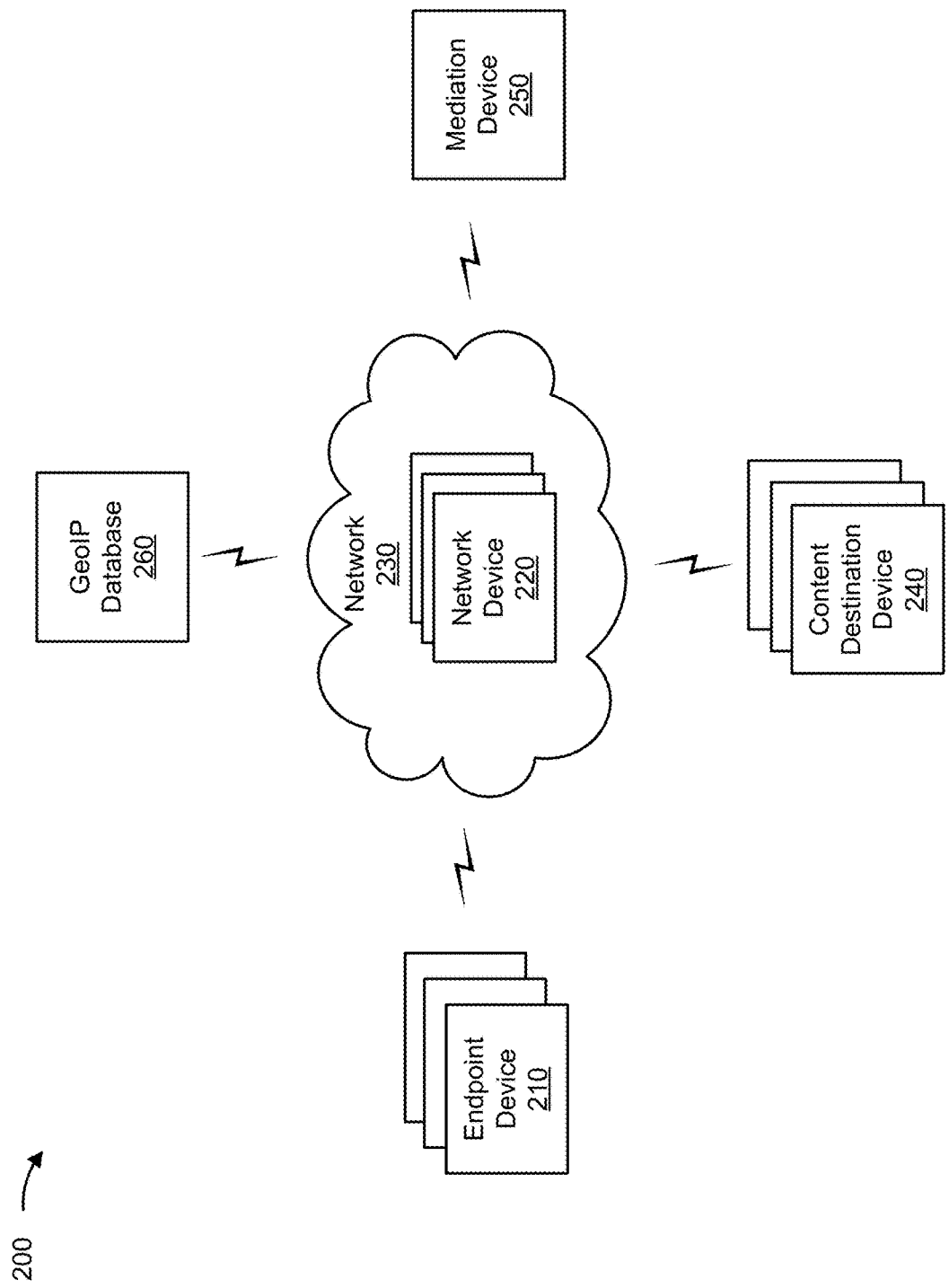
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more endpoint devices 210, one or more network devices 220, a network 230, one or more content destination devices 240, a mediation device 250, and a GeoIP database 260. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 210 may receive network traffic from and/or may provide network traffic to other endpoint devices 210 via network 230 (e.g., by routing packets using network devices 220 as intermediaries).

Network device 220 includes one or more devices capable of receiving, processing, storing, routing, and/or providing traffic (e.g., a packet, other information or metadata, and/or the like) in a manner described herein. For example, network device 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 220 may include a gateway, a switch, a firewall, a hub, a bridge, a reverse proxy, a server (e.g., a proxy server, a cloud server, a data center server, and/or the like), a load balancer, and/or a similar device. In some implementations, network device 220 may be a physical device implemented within a housing, such as a chassis. In some implementations, network device 220 may be a virtual device implemented by one or more computer devices of a cloud computing environment or a data center. In some implementations, a group of network devices 220 may be a group of data center nodes that are used to route traffic flow through network 230.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Content destination device 240 includes one or more devices capable of receiving, generating, storing, processing, and/or providing information, such as information described herein. Content destination device 240 may include a communication device and/or a computing device. For example, content destination device 240 may include a wireless communication device, a user equipment (UE), a mobile phone (e.g., a smart phone or a cell phone, among other examples), a laptop computer, a tablet computer, a handheld computer, a desktop computer, or a similar type of device. Content destination device 240 may be associated with one or more law enforcement authorities (e. g., police departments, government agencies, and/or the like) and may be utilized by the law enforcement authorities to receive particular network traffic of network 230 that is to be monitored for the purpose of analysis and/or evidence. Content destination device 240 may communicate with one or more other devices of environment 2, as described elsewhere herein.

Mediation device 250 includes one or more devices capable of receiving, generating, storing, processing, and/or providing information, such as information described herein. Mediation device 250 may include a communication device and/or a computing device. For example, mediation device 250 may include a wireless communication device, a UE, a mobile phone (e.g., a smart phone or a cell phone, among other examples), a laptop computer, a tablet computer, a handheld computer, a desktop computer, or a similar type of device. Mediation device 250 may be associated with one or more law enforcement authorities (e. g., police departments, government agencies, and/or the like) and may be utilized by the law enforcement authorities to specify particular network traffic of network 230 that is to be monitored for the purpose of analysis and/or evidence. Mediation device 250 may communicate with one or more other devices of environment 2, as described elsewhere herein.

GeoIP database 260 includes one or more devices capable of receiving, generating, storing, processing, and/or providing information, such as information described herein. GeoIP database 260 may include a communication device and/or a computing device. For example, GeoIP database 260 may include a data structure, a server, a database server, an application server, a client server, a web server, a host server, a proxy server, a virtual server (e.g., executing on computing hardware), a server in a cloud computing system, a device that includes computing hardware used in a cloud computing environment, or a similar type of device. GeoIP database 260 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
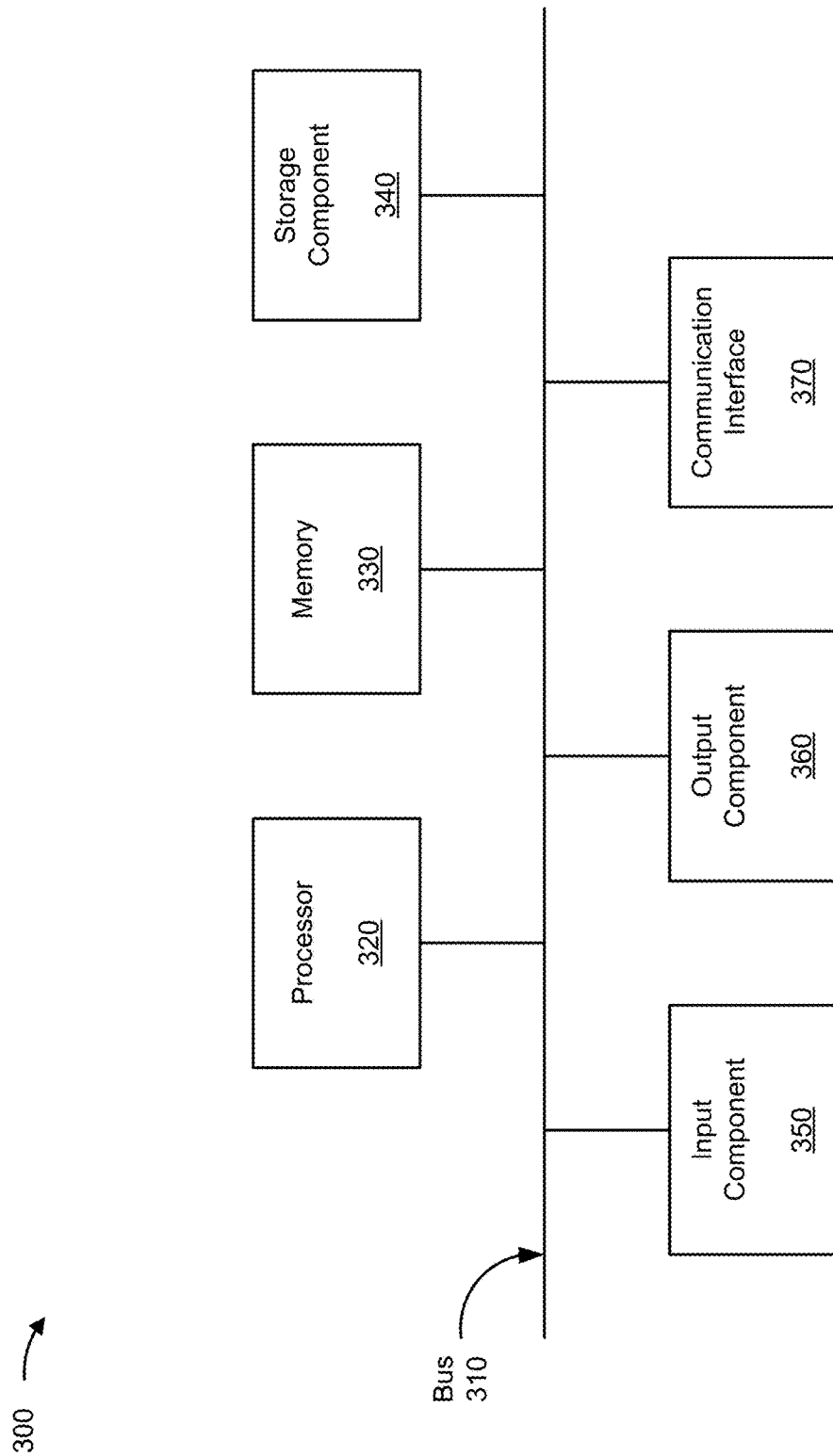
FIGS. 3-4 are diagrams of example components of one or more devices of FIG. 2.

FIG. 3 is a diagram of example components of a device 300. Device 300 may correspond to endpoint device 210, network device 220, content destination device 240, mediation device 250, and/or GeoIP database 260. In some implementations, endpoint device 210, network device 220, content destination device 240, mediation device 250, and/or GeoIP database 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, an RF interface, a universal serial bus (USB) interface, a wireless local area interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
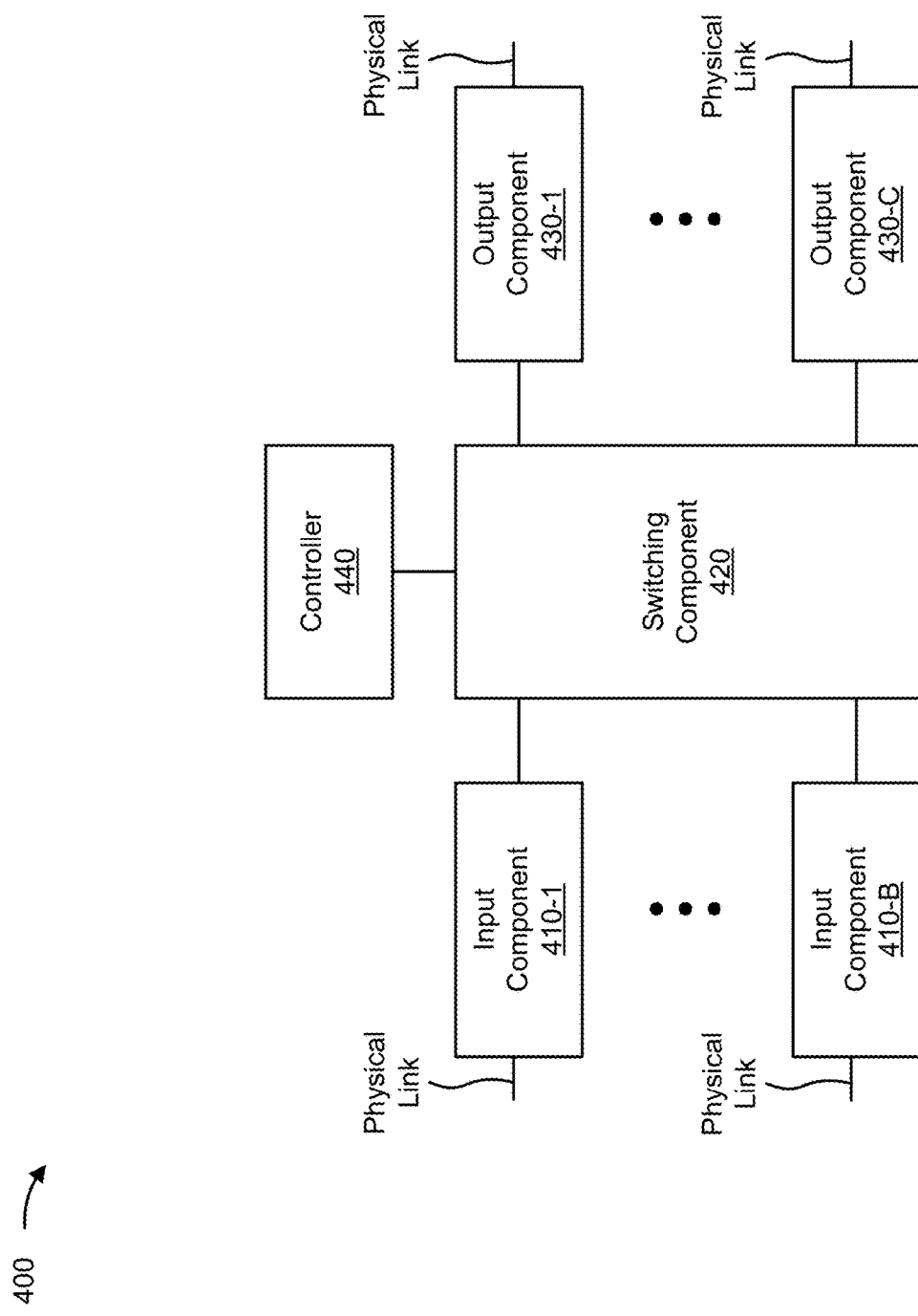

FIG. 4 is a diagram of example components of a device 400. Device 400 may correspond to endpoint device 210, network device 220, content destination device 240, mediation device 250, and/or GeoIP database 260. In some implementations, endpoint device 210, network device 220, content destination device 240, mediation device 250, and/or GeoIP database 260 may include one or more devices 400 and/or one or more components of device 400. As shown in FIG. 4, device 400 may include one or more input components 410-1 through 410-B ($B \geq 1$) (hereinafter referred to collectively as input components 410, and individually as input component 410), a switching component 420, one or more output components 430-1 through 430-C ($C \geq 1$) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
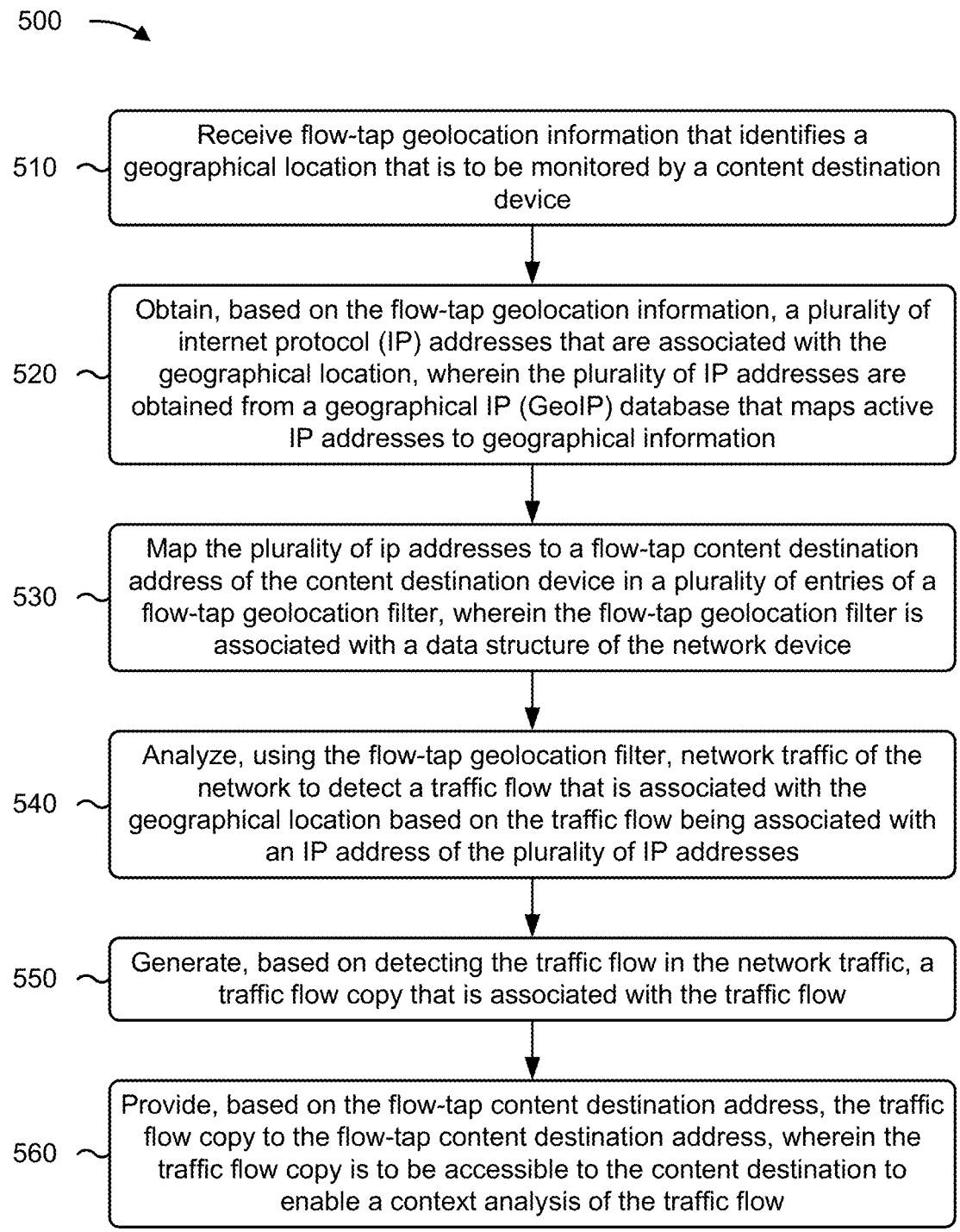
FIGS. 5-7 are flowcharts of example processes relating to network traffic monitoring based on geolocation information.

FIG. 5 is a flowchart of an example process 500 associated with network traffic monitoring based on geolocation information. In some implementations, one or more process blocks of FIG. 5 may be performed by a network device (e.g., network device 220). In some implementations, one or more process blocks of FIG. 5 may be performed by another device or a group of devices separate from or including the network device, such as an endpoint device (e.g., endpoint device 210), a content destination device (e.g., content destination device 240), a mediation device (e.g., mediation device 250), a GeoIP database (e.g., GeoIP database 260), and/or the like. Additionally, or alternatively, one or more process blocks of FIG. 5 may be performed by one or more components of a device 300, such as processor 320, memory 330, storage component 340, input component 350, output component 360, communication interface 370, and/or the like; one or more components of a device 400, such as input component 410, switching component 420, output component 430, controller 440; and/or the like.

As shown in FIG. 5, process 500 may include receiving flow-tap geolocation information that identifies a geographical location that is to be monitored by a content destination device (block 510). For example, the network device may receive flow-tap geolocation information that identifies a geographical location that is to be monitored by a content destination device, as described above.

As further shown in FIG. 5, process 500 may include obtaining, based on the flow-tap geolocation information, a plurality of IP addresses that are associated with the geographical location, wherein the plurality of IP addresses are obtained from a GeoIP database that maps active IP addresses to geographical information (block 520). For example, the network device may obtain, based on the flow-tap geolocation information, a plurality of IP addresses that are associated with the geographical location, as described above. In some implementations, the plurality of IP addresses are obtained from a GeoIP database that maps active IP addresses to geographical information.

As further shown in FIG. 5, process 500 may include mapping the plurality of IP addresses to a flow-tap content destination address of the content destination device in a plurality of entries of a flow-tap geolocation filter, wherein the flow-tap geolocation filter is associated with a data structure of the network device (block 530). For example, the network device may map the plurality of IP addresses to a flow-tap content destination address of the content destination device in a plurality of entries of a flow-tap geolocation filter, as described above. In some implementations, the flow-tap geolocation filter is associated with a data structure of the network device.

As further shown in FIG. 5, process 500 may include analyzing, using the flow-tap geolocation filter, network traffic of the network to detect a traffic flow that is associated with the geographical location based on the traffic flow being associated with an IP address of the plurality of IP addresses (block 540). For example, the network device may analyze, using the flow-tap geolocation filter, network traffic of the network to detect a traffic flow that is associated with the geographical location based on the traffic flow being associated with an IP address of the plurality of IP addresses, as described above.

As further shown in FIG. 5, process 500 may include generating, based on detecting the traffic flow in the network traffic, a traffic flow copy that is associated with the traffic flow (block 550). For example, the network device may generate, based on detecting the traffic flow in the network traffic, a traffic flow copy that is associated with the traffic flow, as described above.

As further shown in FIG. 5, process 500 may include providing, based on the flow-tap content destination address, the traffic flow copy to the flow-tap content destination address, wherein the traffic flow copy is to be accessible to the content destination to enable a context analysis of the traffic flow (block 560). For example, the network device may provide, based on the flow-tap content destination address, the traffic flow copy to the flow-tap content destination address, as described above. In some implementations, the traffic flow copy is to be accessible to the content destination to enable a context analysis of the traffic flow.

Process 500 may include additional implementations, such as any single implementation or any combination of implementations described below and/or in connection with one or more other processes described elsewhere herein.

In a first implementation, receiving the flow-tap geolocation information comprises receiving the flow-tap geolocation information from a mediation device that is associated with the content destination device, and verifying, based on an authentication process, that the mediation device is authorized to utilize the flow-tap geolocation filter, wherein the network traffic is analyzed based on verifying that the mediation device is authorized to utilize the flow-tap geolocation filter.

In a second implementation, alone or in combination with the first implementation, mapping the IP address to the flow-tap content destination address comprises determining, from the flow-tap geolocation information, that the geographical location is associated with a destination location that is to be monitored, and identifying that the IP address is associated with a traffic flow destination of the traffic flow, wherein the traffic flow is detected based on detecting that the IP address is a destination address of the traffic flow.

In a third implementation, alone or in combination with one or more of the first and second implementations, mapping the IP address to the flow-tap content destination address comprises determining, from the flow-tap geolocation information, that the geographical location is associated with a source location that is to be monitored, and identifying that the IP address is associated with a traffic flow source of the traffic flow, wherein the traffic flow is detected based on detecting that the IP address is a source address of the traffic flow.

In a fourth implementation, alone or in combination with one or more of the first through third implementations, obtaining the plurality of IP addresses comprises performing, based on the flow-tap geolocation information, a search of the GeoIP database, copying the plurality of IP addresses from results of the search, and storing the plurality of IP addresses in the plurality of entries in the data structure, wherein the plurality of IP addresses are mapped to the flow-tap content destination address by including the flow-tap content destination address in the plurality of entries.

In a fifth implementation, alone or in combination with one or more of the first through fourth implementations, providing the traffic flow copy of the traffic flow to the flow-tap content destination address comprises determining a protocol associated with the content destination device receiving the traffic flow copy, and providing, according to the protocol, the traffic flow copy to the flow-tap content destination address.

In a sixth implementation, alone or in combination with one or more of the first through fifth implementations, process 500 includes forwarding the traffic flow to a traffic flow destination that is identified in the traffic flow.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
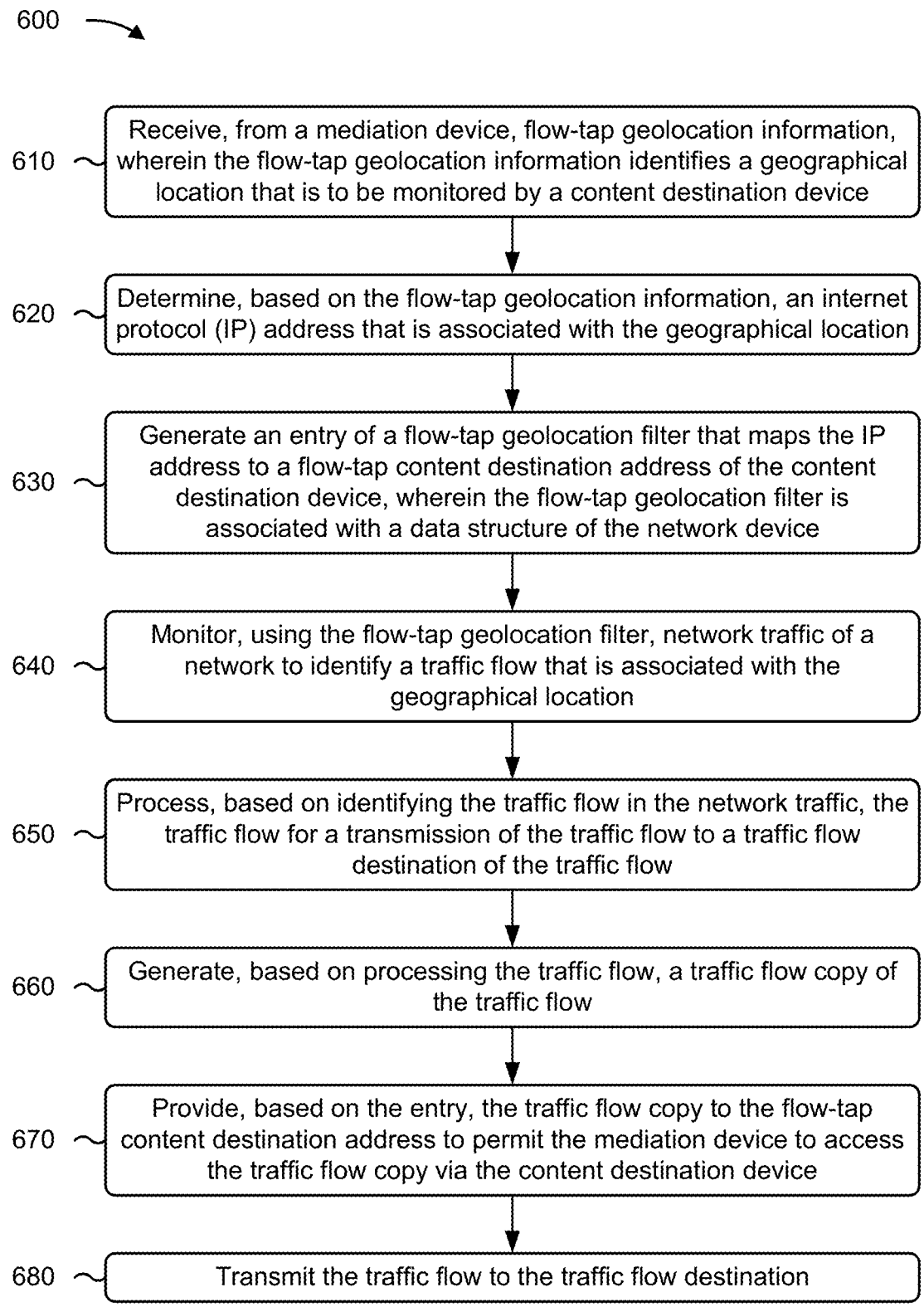

FIG. 6 is a flowchart of an example process 600 associated with network traffic monitoring based on geolocation information. In some implementations, one or more process blocks of FIG. 6 may be performed by a network device (e.g., network device 220). In some implementations, one or more process blocks of FIG. 6 may be performed by another device or a group of devices separate from or including the network device, such as an endpoint device (e.g., endpoint device 210), a content destination device (e.g., content destination device 240), a mediation device (e.g., mediation device 250), a GeoIP database (e.g., GeoIP database 260), and/or the like. Additionally, or alternatively, one or more process blocks of FIG. 6 may be performed by one or more components of a device 300, such as processor 320, memory 330, storage component 340, input component 350, output component 360, communication interface 370, and/or the like; one or more components of a device 400, such as input component 410, switching component 420, output component 430, controller 440; and/or the like.

As shown in FIG. 6, process 600 may include receiving, from a mediation device, flow-tap geolocation information, wherein the flow-tap geolocation information identifies a geographical location that is to be monitored by a content destination device (block 610). For example, the network device may receive, from a mediation device, flow-tap geolocation information, as described above. In some implementations, the flow-tap geolocation information identifies a geographical location that is to be monitored by a content destination device.

As further shown in FIG. 6, process 600 may include determining, based on the flow-tap geolocation information, an IP address that is associated with the geographical location (block 620). For example, the network device may determine, based on the flow-tap geolocation information, an IP address that is associated with the geographical location, as described above.

As further shown in FIG. 6, process 600 may include generating an entry of a flow-tap geolocation filter that maps the IP address to a flow-tap content destination address of the content destination device, wherein the flow-tap geolocation filter is associated with a data structure of the network device (block 630). For example, the network device may generate an entry of a flow-tap geolocation filter that maps the IP address to a flow-tap content destination address of the content destination device, as described above. In some implementations, the flow-tap geolocation filter is associated with a data structure of the network device.

As further shown in FIG. 6, process 600 may include monitoring, using the flow-tap geolocation filter, network traffic of a network to identify a traffic flow that is associated with the geographical location (block 640). For example, the network device may monitor, using the flow-tap geolocation filter, network traffic of a network to identify a traffic flow that is associated with the geographical location, as described above.

As further shown in FIG. 6, process 600 may include processing, based on identifying the traffic flow in the network traffic, the traffic flow for a transmission of the traffic flow to a traffic flow destination of the traffic flow (block 650). For example, the network device may process, based on identifying the traffic flow in the network traffic, the traffic flow for a transmission of the traffic flow to a traffic flow destination of the traffic flow, as described above.

As further shown in FIG. 6, process 600 may include generating, based on processing the traffic flow, a traffic flow copy of the traffic flow (block 660). For example, the network device may generate, based on processing the traffic flow, a traffic flow copy of the traffic flow, as described above.

As further shown in FIG. 6, process 600 may include providing, based on the entry, the traffic flow copy to the flow-tap content destination address to permit the mediation device to access the traffic flow copy via the content destination device (block 670). For example, the network device may provide, based on the entry, the traffic flow copy to the flow-tap content destination address to permit the mediation device to access the traffic flow copy via the content destination device, as described above.

As further shown in FIG. 6, process 600 may include transmitting the traffic flow to the traffic flow destination (block 680). For example, the network device may transmit the traffic flow to the traffic flow destination, as described above.

Process 600 may include additional implementations, such as any single implementation or any combination of implementations described below and/or in connection with one or more other processes described elsewhere herein.

In a first implementation, prior to monitoring the network traffic, process 600 includes verifying, based on credentials of the mediation device, that the mediation device is authorized to utilize the flow-tap geolocation filter, wherein the network traffic is being analyzed based on verifying that the mediation device is authorized to utilize the flow-tap geolocation filter.

In a second implementation, alone or in combination with the first implementation, determining the IP address includes performing, based on the flow-tap geolocation information, a search of a geographical IP database; obtaining results of the search that include the IP address; and identifying that the IP address is associated with the geographical location based on the IP address being included within the results.

In a third implementation, alone or in combination with one or more of the first and second implementations, the results of the search include a plurality of IP addresses that are associated with a geographical region that includes the geographical location and generating the entry includes generating a plurality of entries of the flow-tap geolocation filter that map the plurality of IP address to the flow-tap content destination address, wherein the IP address is one of the plurality of IP addresses and the entry is one of the plurality of entries.

In a fourth implementation, alone or in combination with one or more of the first through third implementations, the flow-tap geolocation information identifies traffic flow destination information that is associated with the traffic flow destination receiving traffic from the geographical location and the traffic flow is identified based on identifying that the traffic flow is from the IP address and to the traffic flow destination.

In a fifth implementation, alone or in combination with one or more of the first through fourth implementations, the flow-tap geolocation information identifies traffic flow source information that is associated with a source that is to provide, via the traffic flow destination, traffic to the geographical location, wherein the traffic flow is identified based on identifying that the traffic flow is from the source and to the IP address.

In a sixth implementation, alone or in combination with one or more of the first through fifth implementations, the flow-tap geolocation information identifies the geographical location based on including at least one of a name of a geographical region associated with the geographical location, a name of a jurisdiction that is associated with the geographical location, a postal code of the geographical location, or geographical coordinates of the geographical location.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
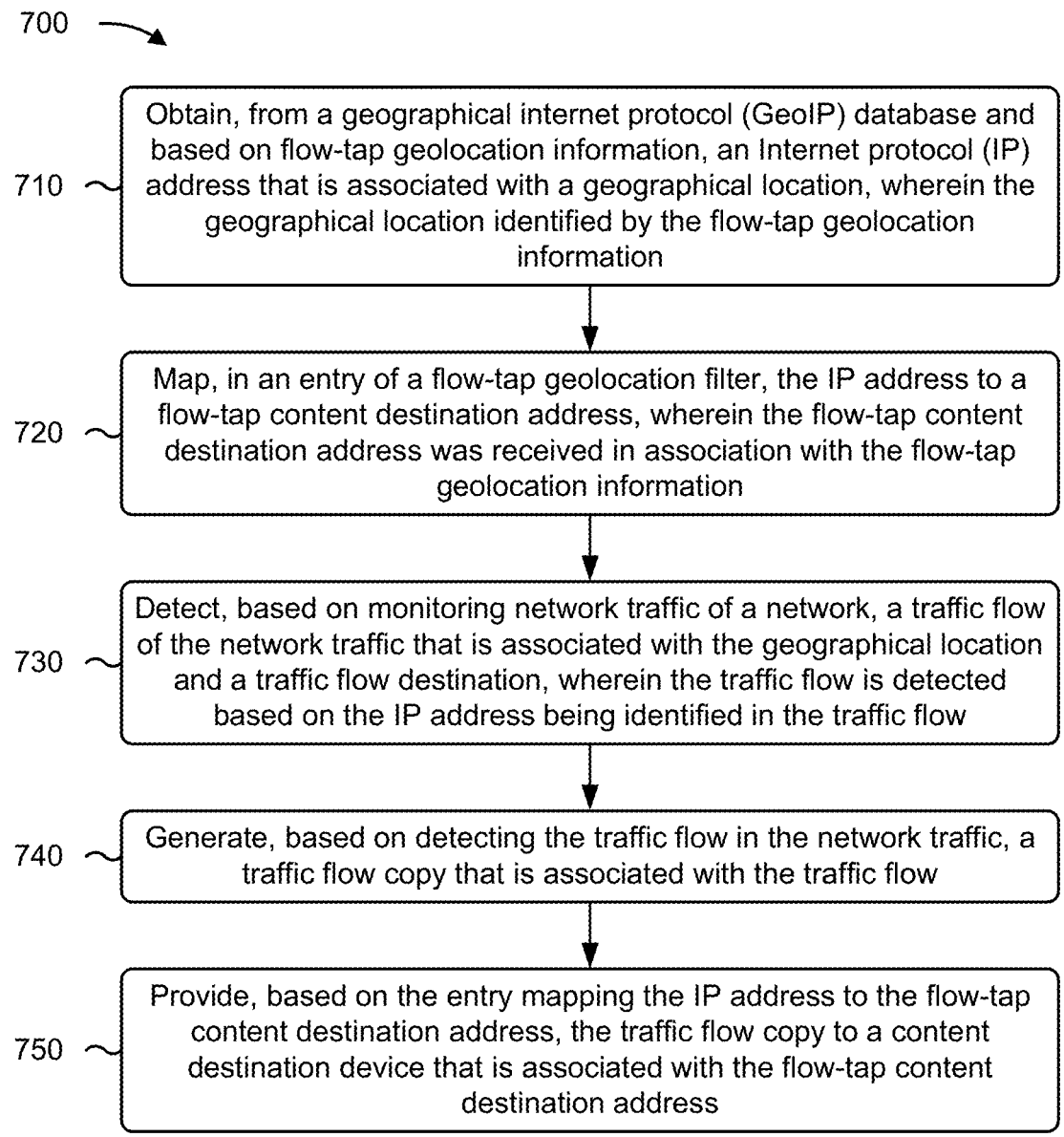

FIG. 7 is a flowchart of an example process 700 associated with network traffic monitoring based on geolocation information. In some implementations, one or more process blocks of FIG. 7 may be performed by a network device (e.g., network device 220). In some implementations, one or more process blocks of FIG. 7 may be performed by another device or a group of devices separate from or including the network device, such as an endpoint device (e.g., endpoint device 210), a content destination device (e.g., content destination device 240), a mediation device (e.g., mediation device 250), a GeoIP database (e.g., GeoIP database 260), and/or the like. Additionally, or alternatively, one or more process blocks of FIG. 7 may be performed by one or more components of a device 300, such as processor 320, memory 330, storage component 340, input component 350, output component 360, communication interface 370, and/or the like; one or more components of a device 400, such as input component 410, switching component 420, output component 430, controller 440; and/or the like.

As shown in FIG. 7, process 700 may include obtaining, from a GeoIP database and based on flow-tap geolocation information, an IP address that is associated with a geographical location, wherein the geographical location identified by the flow-tap geolocation information (block 710). For example, the network device may obtain, from a GeoIP database and based on flow-tap geolocation information, an IP address that is associated with a geographical location, as described above. In some implementations, the geographical location identified by the flow-tap geolocation information.

As further shown in FIG. 7, process 700 may include map, in an entry of a flow-tap geolocation filter, the IP address to a flow-tap content destination address, wherein the flow-tap content destination address was received in association with the flow-tap geolocation information (block 720). For example, the network device may map, in an entry of a flow-tap geolocation filter, the IP address to a flow-tap content destination address, as described above. In some implementations, the flow-tap content destination address was received in association with the flow-tap geolocation information.

As further shown in FIG. 7, process 700 may include detect, based on monitoring network traffic of a network, a traffic flow of the network traffic that is associated with the geographical location and a traffic flow destination, wherein the traffic flow is detected based on the IP address being identified in the traffic flow (block 730). For example, the network device may detect, based on monitoring network traffic of a network, a traffic flow of the network traffic that is associated with the geographical location and a traffic flow destination, as described above. In some implementations, the traffic flow is detected based on the IP address being identified in the traffic flow.

As further shown in FIG. 7, process 700 may include generating, based on detecting the traffic flow in the network traffic, a traffic flow copy that is associated with the traffic flow (block 740). For example, the network device may generate, based on detecting the traffic flow in the network traffic, a traffic flow copy that is associated with the traffic flow, as described above.

As further shown in FIG. 7, process 700 may include providing, based on the entry mapping the IP address to the flow-tap content destination address, the traffic flow copy to a content destination device that is associated with the flow-tap content destination address (block 750). For example, the network device may provide, based on the entry mapping the IP address to the flow-tap content destination address, the traffic flow copy to a content destination device that is associated with the flow-tap content destination address, as described above.

Process 700 may include additional implementations, such as any single implementation or any combination of implementations described below and/or in connection with one or more other processes described elsewhere herein.

In a first implementation, process 700 includes, prior to causing the one or more processors to obtain the IP address, receiving a request to monitor the network from the geographical location, wherein the request is including the flow-tap geolocation information and the flow-tap content destination address from a mediation device that is associated with the content destination device, wherein the IP address is being obtained from the GeoIP database based on receiving the request.

In a second implementation, alone or in combination with the first implementation, process 700, prior to causing the one or more processors to obtain the IP address, includes monitoring a refresh schedule of the flow-tap geolocation filter; and determining, according to the refresh schedule, that the flow-tap geolocation filter is to be updated, wherein the IP address is obtained from the GeoIP database based on determining that the flow-tap geolocation filter is to be updated.

In a third implementation, alone or in combination with one or more of the first and second implementations, the traffic flow is associated with at least one of a particular source, of the traffic flow, that is identified in the entry, or a particular destination, of the traffic flow, that is identified in the entry.

In a fourth implementation, alone or in combination with one or more of the first through third implementations, the traffic flow is associated with a time period that follows an identification of the IP address.

In a fifth implementation, alone or in combination with one or more of the first through fourth implementations, process 700 includes transmitting the traffic flow to the traffic flow destination.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    receiving, by a network device of a network, flow-tap geolocation information that identifies a geographical location that is to be monitored by a content destination device,
        wherein receiving the flow-tap geolocation information comprises receiving the flow-tap geolocation information from a mediation device that is associated with the content destination device;
    obtaining, by the network device and based on the flow-tap geolocation information, a plurality of Internet protocol (IP) addresses that are associated with the geographical location,
        wherein the plurality of IP addresses are obtained from a geographical IP (GeoIP) database that maps active IP addresses to geographical information;
    mapping, by the network device, the plurality of IP addresses to a flow-tap content destination address of the content destination device in a plurality of entries of a flow-tap geolocation filter,
        wherein the flow-tap geolocation filter is associated with a data structure of the network device;
    analyzing, by the network device and using the flow-tap geolocation filter, network traffic of the network to detect a traffic flow that is associated with the geographical location based on the traffic flow being associated with an IP address of the plurality of IP addresses;

generating, by the network device and based on detecting the traffic flow in the network traffic, a traffic flow copy that is associated with the traffic flow; and providing, by the network device and based on the flow-tap content destination address, the traffic flow copy to the flow-tap content destination address, wherein the traffic flow copy is to be accessible to the content destination device to enable a context analysis of the traffic flow.

2. The method of claim 1, wherein receiving the flow-tap geolocation information comprises:

verifying, based on an authentication process, that the mediation device is authorized to utilize the flow-tap geolocation filter, wherein the network traffic is analyzed based on verifying that the mediation device is authorized to utilize the flow-tap geolocation filter.

3. The method of claim 1, wherein mapping the IP address to the flow-tap content destination address comprises:

determining, from the flow-tap geolocation information, that the geographical location is associated with a destination location that is to be monitored; and identifying that the IP address is associated with a traffic flow destination of the traffic flow, wherein the traffic flow is detected based on detecting that the IP address is a destination address of the traffic flow.

4. The method of claim 1, wherein mapping the IP address to the flow-tap content destination address comprises:

determining, from the flow-tap geolocation information, that the geographical location is associated with a source location that is to be monitored; and identifying that the IP address is associated with a traffic flow source of the traffic flow, wherein the traffic flow is detected based on detecting that the IP address is a source address of the traffic flow.

5. The method of claim 1, wherein obtaining the plurality of IP addresses comprises:

performing, based on the flow-tap geolocation information, a search of the GeoIP database;

copying the plurality of IP addresses from results of the search; and storing the plurality of IP addresses in the plurality of entries in the data structure, wherein the plurality of IP addresses are mapped to the flow-tap content destination address by including the flow-tap content destination address in the plurality of entries.

6. The method of claim 1, wherein providing the traffic flow copy of the traffic flow to the flow-tap content destination address comprises:

determining a protocol associated with the content destination device receiving the traffic flow copy; and providing, according to the protocol, the traffic flow copy to the flow-tap content destination address.

7. The method of claim 1, further comprising:

forwarding the traffic flow to a traffic flow destination that is identified in the traffic flow.

8. A network device, comprising:

one or more memories; and one or more processors to:

receive, from a mediation device, flow-tap geolocation information, wherein the flow-tap geolocation information identifies a geographical location that is to be monitored by a content destination device;

determine, based on the flow-tap geolocation information, an Internet protocol (IP) address that is associated with the geographical location;

generate an entry of a flow-tap geolocation filter that maps the IP address to a flow-tap content destination address of the content destination device, wherein the flow-tap geolocation filter is associated with a data structure of the network device;

monitor, using the flow-tap geolocation filter, network traffic of a network to identify a traffic flow that is associated with the geographical location;

process, based on identifying the traffic flow in the network traffic, the traffic flow for a transmission of the traffic flow to a traffic flow destination of the traffic flow;

generate, based on processing the traffic flow, a traffic flow copy of the traffic flow;

provide, based on the entry, the traffic flow copy to the flow-tap content destination address to permit the mediation device to access the traffic flow copy via the content destination device; and transmit the traffic flow to the traffic flow destination.

9. The network device of claim 8, wherein the one or more processors, prior to monitoring the network traffic, are to:

verify, based on credentials of the mediation device, that the mediation device is authorized to utilize the flow-tap geolocation filter, wherein the network traffic is analyzed based on verifying that the mediation device is authorized to utilize the flow-tap geolocation filter.

10. The network device of claim 8, wherein the one or more processors, when determining the IP address, are to:

perform, based on the flow-tap geolocation information, a search of a geographical IP database;

obtain results of the search that include the IP address; and identify that the IP address is associated with the geographical location based on the IP address being included within the results.

11. The network device of claim 10, wherein the results of the search include a plurality of IP addresses that are associated with a geographical region that includes the geographical location, and wherein the one or more processors, when generating the entry, are to:

generate a plurality of entries of the flow-tap geolocation filter that map the plurality of IP address to the flow-tap content destination address, wherein the IP address is one of the plurality of IP addresses and the entry is one of the plurality of entries.

12. The network device of claim 8, wherein the flow-tap geolocation information identifies:

traffic flow destination information that is associated with the traffic flow destination receiving traffic from the geographical location, wherein the traffic flow is identified based on identifying that the traffic flow is from the IP address and to the traffic flow destination.

13. The network device of claim 8, wherein the flow-tap geolocation information identifies:

traffic flow source information that is associated with a source that is to provide, via the traffic flow destination, traffic to the geographical location, wherein the traffic flow is identified based on identifying that the traffic flow is from the source and to the IP address.

14. The network device of claim 8, wherein the flow-tap geolocation information identifies the geographical location based on including at least one of:
- a name of a geographical region associated with the geographical location,
- a name of a jurisdiction that is associated with the geographical location,
- a postal code of the geographical location, or
- geographical coordinates of the geographical location.

15. A non-transitory computer-readable medium storing instructions, the instructions comprising:
- one or more instructions that, when executed by one or more processors, cause the one or more processors to:
  - receive, from a mediation device, flow-tap geolocation information,
    - wherein the flow-tap geolocation information identifies a geographical location that is to be monitored by a content destination device;
  - obtain, from a geographical Internet protocol (GeoIP) database and based on the flow-tap geolocation information, an Internet protocol (IP) address that is associated with a geographical location;
  - map, in an entry of a flow-tap geolocation filter, the IP address to a flow-tap content destination address that is associated with the content destination device,
    - wherein the flow-tap content destination address was received in association with the flow-tap geolocation information;
  - detect, based on monitoring network traffic of a network, a traffic flow of the network traffic that is associated with the geographical location and a traffic flow destination,
    - wherein the traffic flow is detected based on the IP address being identified in the traffic flow;
  - generate, based on detecting the traffic flow in the network traffic, a traffic flow copy that is associated with the traffic flow; and
  - provide, based on the entry mapping the IP address to the flow-tap content destination address, the traffic flow copy to the content destination device.

16. The non-transitory computer-readable medium of claim 15, wherein the one or more instructions, prior to causing the one or more processors to obtain the IP address, cause the one or more processors to:
- receive a request to monitor the network from the geographical location,
  - wherein the request includes the flow-tap geolocation information and the flow-tap content destination address from the mediation device,
  - wherein the IP address is obtained from the GeoIP database based on receiving the request.

17. The non-transitory computer-readable medium of claim 15, wherein the one or more instructions, prior to causing the one or more processors to obtain the IP address, cause the one or more processors to:
- monitor a refresh schedule of the flow-tap geolocation filter; and
- determine, according to the refresh schedule, that the flow-tap geolocation filter is to be updated,
  - wherein the IP address is obtained from the GeoIP database based on determining that the flow-tap geolocation filter is to be updated.

18. The non-transitory computer-readable medium of claim 15, wherein the traffic flow is associated with at least one of:
- a particular source, of the traffic flow, that is identified in the entry, or a particular destination, of the traffic flow, that is identified in the entry.

19. The non-transitory computer-readable medium of claim 15, wherein the traffic flow is associated with a time period that follows an identification of the IP address.

20. The non-transitory computer-readable medium of claim 19, wherein the one or more instructions, when executed, are further to cause the one or more processors to: transmit the traffic flow to the traffic flow destination.

* * * * *